United States Patent
Bueter (10) Patent No.: US 9,810,322 B2
(45) Date of Patent: Nov. 7, 2017

(54) PISTON UNIT OF A WORKING CYLINDER

(71) Applicants: BÜMACH ENGINEERING INTERNATIONAL B.V., TA Emmen (NL); Josef Bueter, Haren/Altenberge (DE)

(72) Inventor: Josef Bueter, Haren/Altenberge (DE)

(73) Assignee: Buemach Engineering International B.V., Ta Emmen (NL)

( * ) Notice: Subject to any disclaimer, the term of this patent is extended or adjusted under 35 U.S.C. 154(b) by 220 days.

(21) Appl. No.: 14/429,457

(22) PCT Filed: Sep. 19, 2013

(86) PCT No.: PCT/DE2013/000532
§ 371 (c)(1),
(2) Date: Mar. 19, 2015

(87) PCT Pub. No.: WO2014/044244
PCT Pub. Date: Mar. 27, 2014

(65) Prior Publication Data
US 2015/0226326 A1 Aug. 13, 2015

(30) Foreign Application Priority Data
Sep. 19, 2012 (DE) .................. 20 2012 008 997 U (51) Int. Cl.
*F16J 1/12* (2006.01)
*F16B 3/04* (2006.01)
*F15B 15/14* (2006.01)

(52) U.S. Cl.
CPC .......... *F16J 1/12* (2013.01); *F15B 15/1447* (2013.01); *F16B 3/04* (2013.01); *Y10T 403/7075* (2015.01)

(58) Field of Classification Search
CPC ...... F16B 3/04; F16B 21/186; F15B 15/1438; F15B 15/1447; F16J 1/10; F16J 1/12
See application file for complete search history.

(56) References Cited

U.S. PATENT DOCUMENTS

| 1,899,343 A | * | 2/1933 | Mackey | ................. | B21D 39/06 |
| | | | | | 16/DIG. 42 |
| 3,443,848 A | * | 5/1969 | Philippot | .................. | F16B 3/04 |
| | | | | | 384/537 |

(Continued)

FOREIGN PATENT DOCUMENTS

| DE | 838670 B | | 5/1952 | | |
| DE | 28 51 997 | * | 6/1980 | ................ | F16B 3/04 |

(Continued)

*Primary Examiner* — Michael P Ferguson
(74) *Attorney, Agent, or Firm* — Laurence A. Greenberg; Werner H. Stemer; Ralph E. Locher (57) ABSTRACT

A piston unit of a working cylinder has first and second coupling partners. The first coupling partner is a piston. The second coupling partner a piston rod. The piston rod is inserted axially into the piston. Each of the coupling partners has an annular groove. The groove of the piston rod is an external groove. The groove of the piston is an internal groove. The grooves of the coupling partners lie opposite one another. The unit has a coupling strand which engages in the grooves of the coupling partners and is placed into engagement by insertion into an annular groove gap defined by the grooves. The engagement of the coupling strand in the grooves produces a form-locking connection between the partners. The piston rod is oversized in relation to the piston and provides an additional frictional connection.

8 Claims, 7 Drawing Sheets

(56) References Cited

U.S. PATENT DOCUMENTS

| | | | | |
|---|---|---|---|---|
| 3,986,635 A | * | 10/1976 | Niskin | B65D 45/00 |
| | | | | 220/319 |
| 4,771,678 A | | 9/1988 | Walker | |
| 4,878,419 A | | 11/1989 | Vick | |
| 5,014,871 A | * | 5/1991 | Mutter | F16B 3/04 |
| | | | | 215/274 |
| 5,335,807 A | * | 8/1994 | Gregory | B65D 55/02 |
| | | | | 215/274 |
| 5,400,695 A | | 3/1995 | Walker | |
| 6,032,569 A | | 3/2000 | Armo | |

FOREIGN PATENT DOCUMENTS

| | | |
|---|---|---|
| EP | 0348687 A1 | 1/1990 |
| JP | H0627434 U | 4/1994 |
| JP | 2001165118 A | 6/2001 |
| WO | 9721946 A1 | 6/1997 |

\* cited by examiner

PISTON UNIT OF A WORKING CYLINDER

BACKGROUND OF THE INVENTION

Field of the Invention

The invention relates to a piston unit of a working cylinder, provided in particular as a hydraulic or pneumatic pressurized-flow consumer.

Working cylinders as hydraulic or pneumatic pressurized-flow consumers which have a piston unit are generally known from the prior art.

Working cylinders of said type are generally of multi-part form, wherein the piston unit is composed of a piston and of a piston rod connected to said piston.

The connection between the piston and the piston rod is in this case realized, in a known manner, by way of a positively locking and/or non-positively locking and/or cohesive connection, wherein the connection may be releasable or non-releasable depending on the application.

In the narrower sense, releasable connections are in this case normally realized by means of screw connections between the piston and the piston rod or by means of fit connections, whereas the non-releasable connections are generally provided by welding, brazing or adhesive bonding of the piston to the piston rod.

Furthermore, it is known from the prior art for components of a piston unit, in particular piston and piston rod, to be connected to one another in positively locking fashion by means of an inserted coupling strand.

For this purpose, the components to be connected have respectively corresponding annular grooves into which the coupling strand engages and thus provides the positive locking between the components.

A disadvantage of such connections lies in the fact that the coupling strand has a certain undersize in relation to the dimensions of the annular grooves in order that, during the assembly process, the coupling strand is not subject to excessive friction and can actually be inserted, and can assume its final position in the annular grooves. This results in a minimal clearance which, in the event of changes in the load state of the piston unit, can lead to minimal axial relative movements between the piston and piston rod.

Owing to these relative movements, the seal elements provided between the components are subjected to undesired abrasion grinding phenomena, which in the worst case can lead to a defect of any seal elements that may be provided, and thus to failure of the working cylinder. Furthermore, the clearance can increase further as a result of the dynamic processes and associated abrasion inter alia in the region of annular grooves and coupling strand.

BRIEF SUMMARY OF THE INVENTION

It is therefore an object of the invention to provide a piston unit for a working cylinder, which piston unit is particularly simple and inexpensive to produce and at the same time exhibits high endurance strength and thus a lengthened service life.

The object is achieved by means of the features specified in the independent claims. Preferred refinements will emerge from the subclaims.

A piston unit according to the invention of a working cylinder has a first coupling partner and a second coupling partner. The first coupling partner is in this case in the form of a piston and the second coupling partner is in the form of a piston rod.

The piston rod may particularly advantageously be in the form of a hollow element.

Such an embodiment as a hollow element permits the provision of a particularly lightweight piston rod and thus an optimization of the overall weight of a piston unit having a piston rod designed in this way.

Furthermore, according to the invention, the second coupling partner is inserted into the first coupling partner.

In this context, "inserted" is to be understood to mean that the second coupling partner is engaged around radially by the first coupling partner.

The technical solution can be used both in the case of a piston unit in which the piston rod is inserted only in sections into the piston and the piston is formed with a closed base, as is generally the case, for example, with a differential working cylinder, and in the case of a piston unit in which a continuous piston rod extends through the piston, as is the case, for example, with a synchronization cylinder.

According to the invention, the piston unit is distinguished by the fact that the coupling partners each have an annular groove which is preferably of encircling form, wherein the annular groove of the inserted coupling partner is formed by an external groove and the annular groove of the other coupling partner is formed by an internal groove.

According to the invention, the axial positioning of the annular groove in the coupling partners is such that the annular grooves are situated correspondingly opposite one another when the coupling partners are in the coupled state.

In this context, "situated correspondingly opposite" is to be understood to mean that the opening regions of the annular grooves face toward one another and, as viewed in the axial direction of the working cylinder, are situated at the same level, wherein the region that forms between the correspondingly oppositely situated annular grooves will hereinafter be referred to as "annular-groove chamber".

Furthermore, the working cylinder is distinguished by the fact that one of the coupling partners has an access opening to the annular-groove chamber.

It is preferably the case here that the access opening is arranged in the non-inserted coupling partner, wherein according to the invention, it may also be provided, depending on the application, that the access opening is arranged in the inserted coupling partner. The access opening preferably leads tangentially into the annular-groove chamber.

Furthermore, a piston unit according to the invention has a coupling strand.

The coupling strand is formed in particular by a metal element in strand form, and, according to the invention, engages into the annular grooves of both coupling partners.

For this purpose, according to the invention, the coupling strand can be inserted through the access opening of the respective coupling partner into the annular chamber that is formed.

In this case, the coupling strand is inserted by way of corresponding external action, preferably by being fired in.

The coupling strand is preferably inserted to such an extent that the inserted end of the coupling strand and the coupling strand itself come into contact.

According to the invention, depending on the application, it is also possible for the coupling strand to be inserted only in sections into the annular chamber between the coupling partners, such that the inserted end of the coupling strand and the coupling strand itself do not come into contact.

According to the invention, during the insertion process, the coupling strand, which is preferably of elongate form before the assembly process, adapts to the spatial profile of the annular-groove chamber such that abutment of the axial outer walls of the coupling strand against the axial walls of the annular grooves of both coupling partners has the effect that a positively locking connection is effected between the coupling partners. The coupling partners are fixed in their axial relative position with respect to one another by the positive locking. Axial forces exert a shear load on the coupling strand. The solution according to the invention also encompasses the possibility of multiple coupling strands being arranged, so as to abut against one another axially, in an annular-groove chamber of correspondingly broad form, in order that high shear forces can be accommodated. It is preferably the case that, in the coupled state, the coupling strand also bears by way of its radial external wall against the groove base wall of the annular grooves of both coupling partners, such that said coupling strand is reliably fixed in its position and completely fills the annular-groove chamber.

By means of the proposed solution, a piston unit of a working cylinder is thus provided in which the required coupling partners are connectable to one another exclusively through the use of a load-bearing coupling strand, wherein the connection is realized in a particularly simple manner by virtue of the coupling strand being inserted into the annular-groove chamber formed by the correspondingly oppositely situated annular grooves of the coupling partners.

This coupling solution reduces the manufacturing, material and assembly costs, which in turn have a considerable influence on the reduction of energy costs.

Adverse effects arising from the action of heat, such as may be encountered for example in the case of a shrink-fit coupling or in the case of a welded connection, are eliminated.

In relation to the known solutions, a piston unit according to the invention thus has the technological advantages firstly that said piston unit is particularly easy to produce and, furthermore, no additional method steps are required, in particular for the production of a cohesive connection between the coupling partners, whereby in particular, the production costs for a piston unit of said type can be lowered.

Furthermore, a piston unit according to the invention is characterized, in relation to conventional devices, by greater endurance strength and thus a lengthened service life. As a further major advantage, all angular positions of the coupling partners relative to one another, and thus the orientation of the piston in the cylinder, can be realized easily and without additional outlay.

The piston unit according to the invention is furthermore characterized in that the second coupling partner, which is to be inserted, has a corresponding oversize in relation to an internal dimension of the first coupling partner, and in that, in the final assembled position, there is thus an interference fit between the coupling partners. The interference fit produces frictional locking between the coupling partners. Axially acting forces can be accommodated by way of the frictional locking. Furthermore, the coupling partners are secured so as to be prevented from twisting.

In this way, as a special technological advantage of the solution, a hybrid coupling action is realized which is composed of a non-positive locking coupling action effected by the interference fit and a positive locking coupling action effected by the coupling strand, said hybrid coupling action being distinguished by an increase of the maximum axial forces that can be accommodated and by an improvement in the endurance strength of the piston unit. The axial forces to be accommodated can be divided between the two coupling actions, wherein the ratio can be set through design measures.

The two coupling partners are fixed to one another axially without a clearance by way of the frictional locking. Thus, as a special advantage, any axial movement of the coupling partners relative to one another occurring in the event of alternation between the piston unit being subjected to load and being relieved of load during intended operation, which axial movement could for example lead to damage of any seal elements that are provided, can be prevented.

Such seal elements are provided in particular in the case of synchronization cylinders, in which the piston rod extends through the piston, and serve for preventing the passage of a working medium from one working chamber of the synchronization cylinder into the other working chamber.

According to the invention, the positively locking connection by way of the coupling strand and the non-positively locking connection by way of the frictional locking between the coupling partners act together.

In particular, in the case of piston units of single-acting working cylinders, the frictional locking has the effect that the relative position assumed by the coupling partners under high loads, which relative position corresponds to a clearance end position of the coupling strand with respect to the axial side walls of the annular grooves, is maintained even in the event of a change in load state. The frictional locking is thus overcome at least in the presence of full operating pressure, such that the coupling partners are moved into the clearance end position and, there, are prevented from further axial relative movement by the positive locking. However, the frictional locking prevents an axial return movement out of said clearance end position and thus fixes the coupling partners relative to one another in the relative position of the clearance end position. This applies correspondingly in the case of a piston unit of a differential working cylinder, in which the force that can be exerted on the piston from the piston rod chamber side is lower than the force that can be accommodated by the non-positively locking connection effected by the frictional locking, whereas the force that can be exerted on the piston from the piston base chamber side is however greater.

By means of the proposed solution, a piston unit of a working cylinder is thus provided in which, firstly, the required coupling partners are connectable to one another in positively locking fashion through the use of a load-bearing coupling strand, wherein the connection is realized in a particularly simple manner by virtue of the coupling partners being inserted one into the other and the coupling strand subsequently being inserted.

Secondly, a relative movement between the coupling partners is fully prevented by the frictional locking that is realized.

According to the invention, it may furthermore likewise be provided that the axial forces are accommodated solely by the non-positively locking interference fit, wherein the positive locking effected by the coupling strand acts in this case merely as a safeguard for preventing the inserted coupling partner from being pulled out of the respective other coupling partner. In this case, as a special advantage, it is made possible for the non-positively locking interference fit, including the contact surfaces required therefor, to be dimensioned in accordance with the normative load states, but at the same time, by means of the additional positively locking connection by means of the coupling strand, critical overloads can be reliably accommodated.

In a preferred variant, one of the coupling partners has a run-on bevel which facilitates the assembly of the coupling partners and in particular the insertion of the second coupling partner into the first coupling partner.

If, in particular in the case of a piston unit of a synchronization cylinder, a seal element is provided, the coupling partner which does not receive the seal element has the run-on bevel.

Said run-on bevel particularly advantageously has the effect that, as one coupling partner is inserted into the other coupling partner, the seal element is pushed back in the direction of the respective coupling partner which receives the seal element, and thus damage to the seal element is prevented.

Thus, as a special technological advantage, it is not necessary for the seal element to be pressed in a direction of the respective coupling partner by way of additional apparatuses or expenditure of effort before the coupling partners are inserted one into the other.

With regard to the run-on bevel, it is self-evident to a person skilled in the art that, in special configurations, in particular of the seal element, it is also possible for multiple individual run-on bevels to be provided on the respective coupling partner instead of a single run-on bevel.

In a preferred refinement, the coupling partners of a piston unit according to the invention have further, axially offset annular grooves for receiving further, likewise axially offset coupling strands.

For the insertion of the coupling strands into the annular-groove chambers that are formed in each case, one coupling partner furthermore has multiple access openings, wherein each access opening is preferably assigned to one annular-groove chamber.

The provision of multiple annular grooves and multiple coupling strands is advantageous in particular when the connection is to be subjected to high axial forces during use of the piston unit.

To ensure that the coupling partners are inserted one into the other reliably and without damage even in the case of multiple coupling strands being arranged between the coupling partners, the annular grooves preferably likewise have run-on bevels, wherein in particular, the run-on bevels cause a seal element that is provided to be pushed back once again.

Furthermore, a further advantageous variant of the invention provides that the coupling strand has a circular cross section.

At the same time, the geometrical contour of the annular-groove chamber which receives the coupling strand is adapted to the circular cross section of the coupling strand. One advantage here consists in that, when the positively locking connection of the coupling partners is subjected to load, the notch effects arising in the coupling partners in the region of the annular-groove chamber can be reduced in an effective manner in relation to an annular-groove chamber of rectangular cross section.

In relation to coupling strands with a rectangular cross section, a coupling strand according to the invention with circular cross section has a more expedient stress profile in its interior under the action of load, whereby in particular, the durability of the positively locking connection of the piston unit can be yet further improved.

At the same time, a coupling strand with circular cross section can be produced particularly easily and inexpensively.

A further advantageous refinement of the invention presents a simple but effective way of achieving a further improvement. A piston rod preferably exhibits higher material quality, in particular a higher modulus of elasticity, than a piston. To keep the surface pressure at the side walls within the surface pressure values admissible for the specific material, but at the same time to avoid forming the annular grooves to be deeper than required, a solution was arrived at in which the coupling strand, in its engaged position, engages with a greater area of overlap into the coupling partner with the lower modulus of elasticity. The area of overlap is to be understood to mean that part of the area of the axially directed side wall of the coupling strand by which said coupling strand bears under axial load against the side wall of the groove of a coupling partner. The size relationships of the areas of overlap of the coupling strand can in this case be defined in a simple manner by way of the ratio of the depths of the annular grooves relative to one another. In particular in the case of the piston rod being in the form of a hollow element, it is possible in this way for the depth of the annular groove in the piston rod to be made very small, whereas the coupling strand, in the engaged position, engages into the piston to a correspondingly greater depth.

In a further advantageous refinement of the invention, the annular-groove chamber which receives the coupling strand is of conical arrangement in the piston unit.

In this context, a conical arrangement is to be understood to mean that the annular-groove chamber has a rectangular cross section and that, owing to the rectangular cross section, on an axial top side and the bottom side of the annular-groove chamber, two different ring diameters are formed, wherein the conical form in this case has the effect, for example, that the ring diameter of the top side of the annular-groove chamber is smaller than the ring diameter of the bottom side. The radial delimiting surfaces of the annular-groove chamber thus correspond to the lateral surface of a flat frustum.

It is possible in a particularly advantageous manner for there to be inserted into the conically arranged annular-groove chamber a coupling strand which, as it is inserted, adapts to the geometric shape of the annular-groove chamber and which, when it reaches its final position in the annular-groove chamber, is thus likewise present in a conical shape. In order that the coupling strand can correspondingly adapt, by deformation, to the conical annular-groove chamber, the coupling strand is preferably of segmented form, wherein this may in particular be realized by way of axial incisions. It is possible to realize an expedient, relatively low surface pressure, which is advantageous in particular in the case of a relatively low-grade material in particular of a piston, with a simultaneously narrow form of the coupling strand.

By means of such a conical form of the annular-groove chamber and of the coupling strand arranged therein, a particularly reliable and durable connection of the coupling partners is realized.

Furthermore, one preferred embodiment of the invention provides that one end of the coupling strand is accessible such that the coupling strand can be pulled out of the annular-groove chamber.

For this purpose, the respective end section of the coupling strand may for example have a projecting length, or the coupling partner which has the access opening may have provided therein a hollow which provides access to the end of the coupling strand for the purposes of external manipulation. In this case, the coupling strand may preferably be of hook-shaped form or have a threaded section in order that tensile forces can be introduced in an effective manner.

BRIEF DESCRIPTION OF THE SEVERAL
VIEWS OF THE DRAWING

The invention will be explained in more detail below, on the basis of exemplary embodiments, with reference to.

DESCRIPTION OF THE INVENTION

Figure 1:
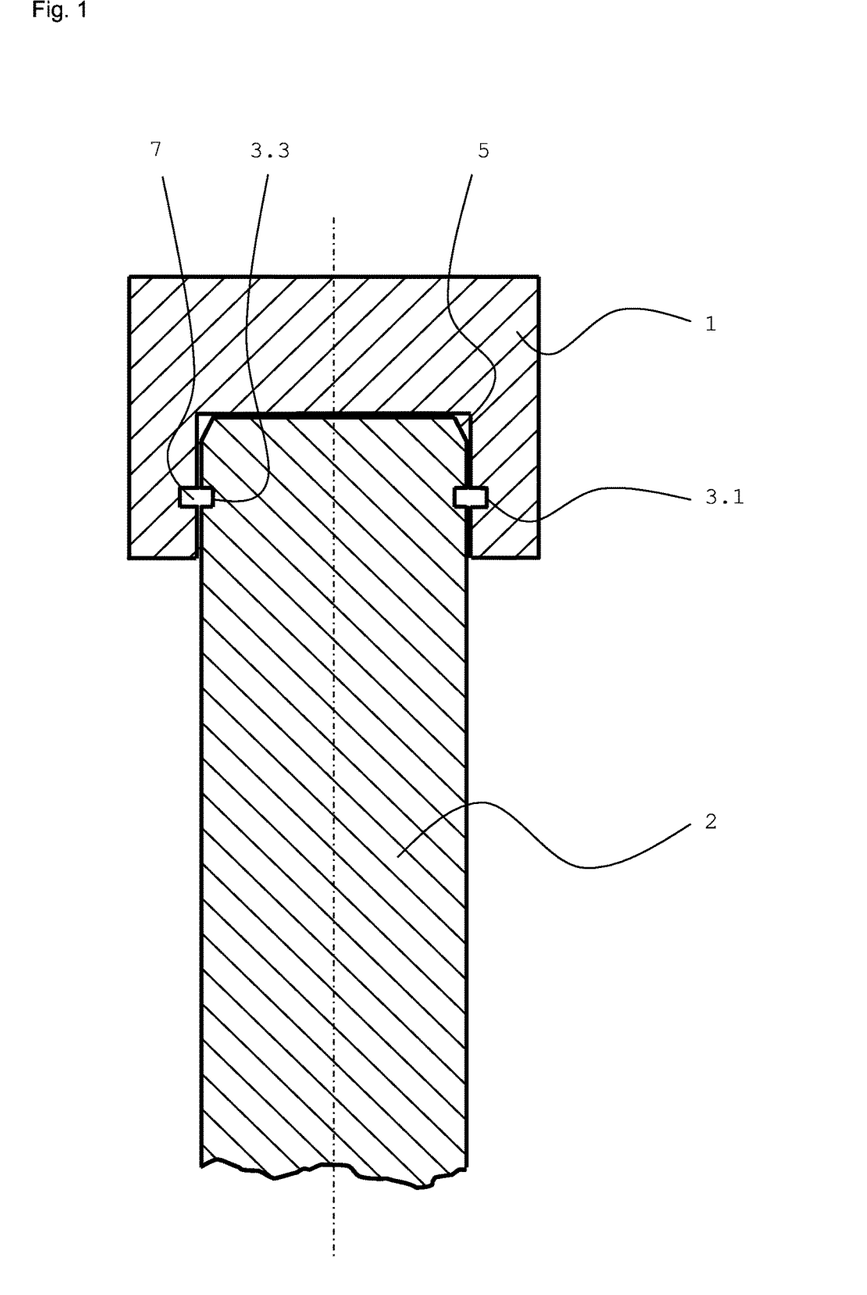
FIG. 1 which shows a sectional illustration of a piston unit without a coupling strand, FIG. 2 which shows a sectional illustration of a piston unit with a coupling strand, FIG. 3 which shows a half-section of a piston unit with two coupling strands, FIG. 4 which shows a half-section of a piston unit with a circular coupling strand, FIG. 5 which shows a half-section of a piston unit with a conical annular-groove chamber and a conical coupling strand, FIG. 6 which shows a sectional illustration of a piston unit in a plan view, FIG. 7 which shows a partial enlarged sectional illustration of a coupling strand region of a piston unit, FIG. 8 which shows another partial enlarged sectional illustration of a coupling strand region of a piston unit.

FIG. 1 shows a piston unit according to the invention, without a coupling strand, in a full section.

The piston unit is of multi-part form and has a piston 1 and a piston rod 2, wherein the piston rod 2 has been partially inserted into the piston 1.

Below, the piston 1 and the piston rod 2 will also be described collectively as coupling partners.

The piston 1 and the piston rod 2 each have a first annular groove 3.1 and 3.3, wherein the first annular groove 3.1 of the piston 1 is in the form of an encircling internal groove and the first annular groove 3.3 of the piston rod 2 is in the form of an encircling external groove, and wherein the annular grooves 3 form an annular-groove chamber 7.

In order to facilitate the insertion of the piston rod 2 into the piston 1, the piston rod additionally has, on the end facing toward the piston 1, a run-on bevel 5 of encircling form.

According to the invention, the piston 1 and piston rod 2 are coupled to one another by means of a positively locking connection.

Figure 2:
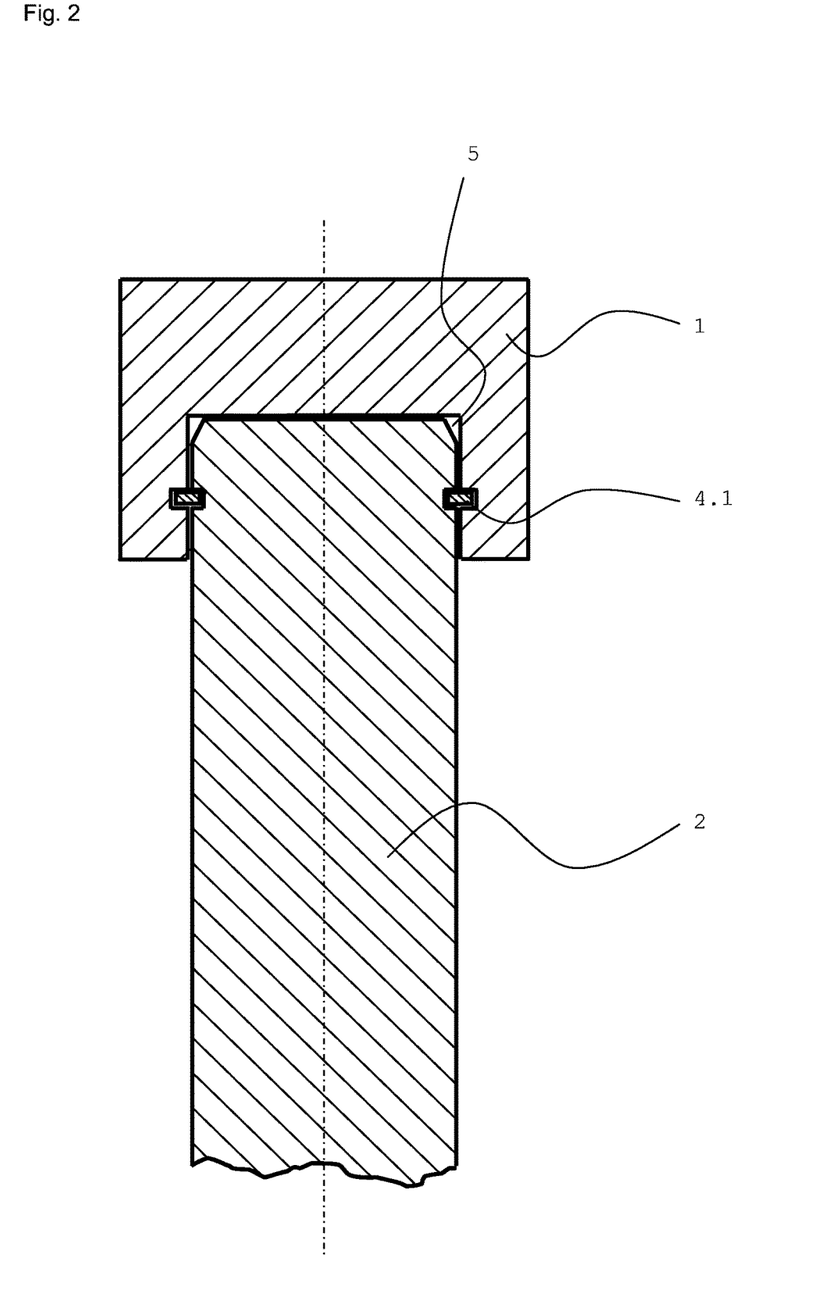

As illustrated in FIG. 2, the positively locking connection is in the present case realized by virtue of a coupling strand 4.1 being arranged within the annular-groove chamber 7 of the piston unit.

In the present case, the coupling strand 4.1 has a rectangular cross section, wherein according to the invention, coupling strands with other forms of cross section may also be used.

The positive locking of the coupling of the piston 1 and of the piston rod 2 is realized according to the invention in that, in the final position of the piston rod 2 in the piston 1, that surface of the coupling strand 4.1 which faces toward the piston-side end of the piston rod 2 bears against those walls of the annular grooves 3.1 and 3.3 which face toward the coupling strand 4.1.

As a special technological feature, the external diameter of the piston rod 2 has an oversize in relation to the internal diameter of the piston 1.

The oversize has the effect that, in the final assembled position of the piston rod 2, an interference fit and thus frictional locking is produced between said piston rod and the piston 1.

Owing to the frictional locking that is provided, the piston rod 2 and the piston 1 are fixed axially in their position relative to one another without a clearance, whereby the piston 1 is prevented in an effective manner from moving axially relative to the piston rod 2. In this way, abrasion grinding phenomena can be prevented.

Furthermore, owing to the interference fit that is provided, undesired twisting of the piston 1 relative to the piston rod 2 is prevented.

In the present exemplary embodiment, the forces arising during the intended operation of a working cylinder in which the piston unit is received are accommodated entirely by way of the frictional locking that is provided. In the present exemplary embodiment, the positively locking connection of the coupling partners 1 and 2 by means of the coupling strand 4.1 thus serves for realizing a securing action in order, even in extreme load states of the working cylinder, for example in the event of incorrect operation and the frictional locking possibly being overcome as a result, to prevent detachment of the piston 1 from the piston rod 2. The operational reliability is thus increased without an increase in dimensions of the interference fit.

Figure 3:
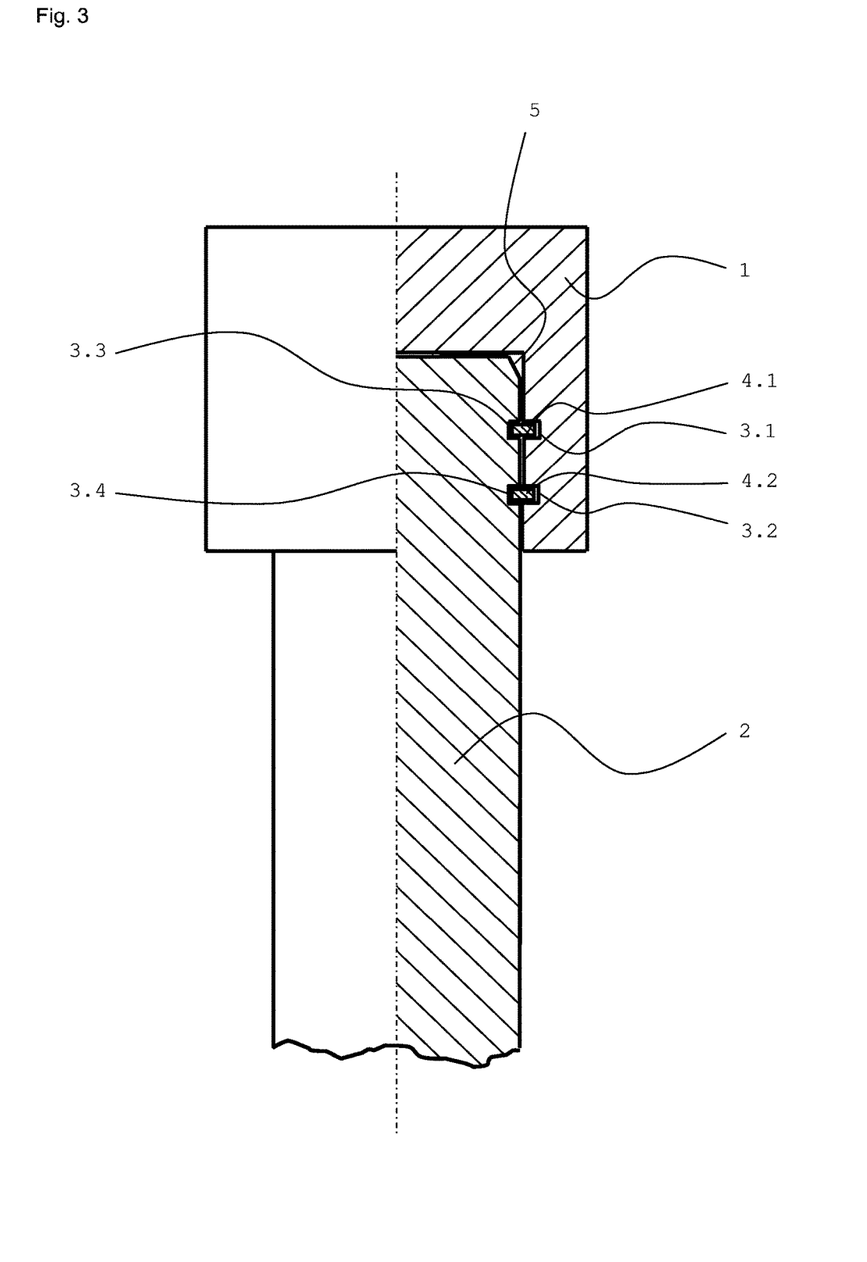

FIG. 3 shows an exemplary embodiment of a piston unit according to the invention in half-section, wherein, to increase the axial load-bearing capacity, the piston unit has two coupling strands 4.1 and 4.2.

In the present case, the coupling strand 4.1 is arranged in the annular-groove chamber between a first annular groove 3.1 of the piston 1 and a first annular groove 3.3 of the piston rod 2.

The coupling strand 4.2 is arranged in a further annular-groove chamber which is formed by a second annular groove 3.2 of the piston 1 and a second annular groove 3.4 of the piston rod 2.

Figure 4:
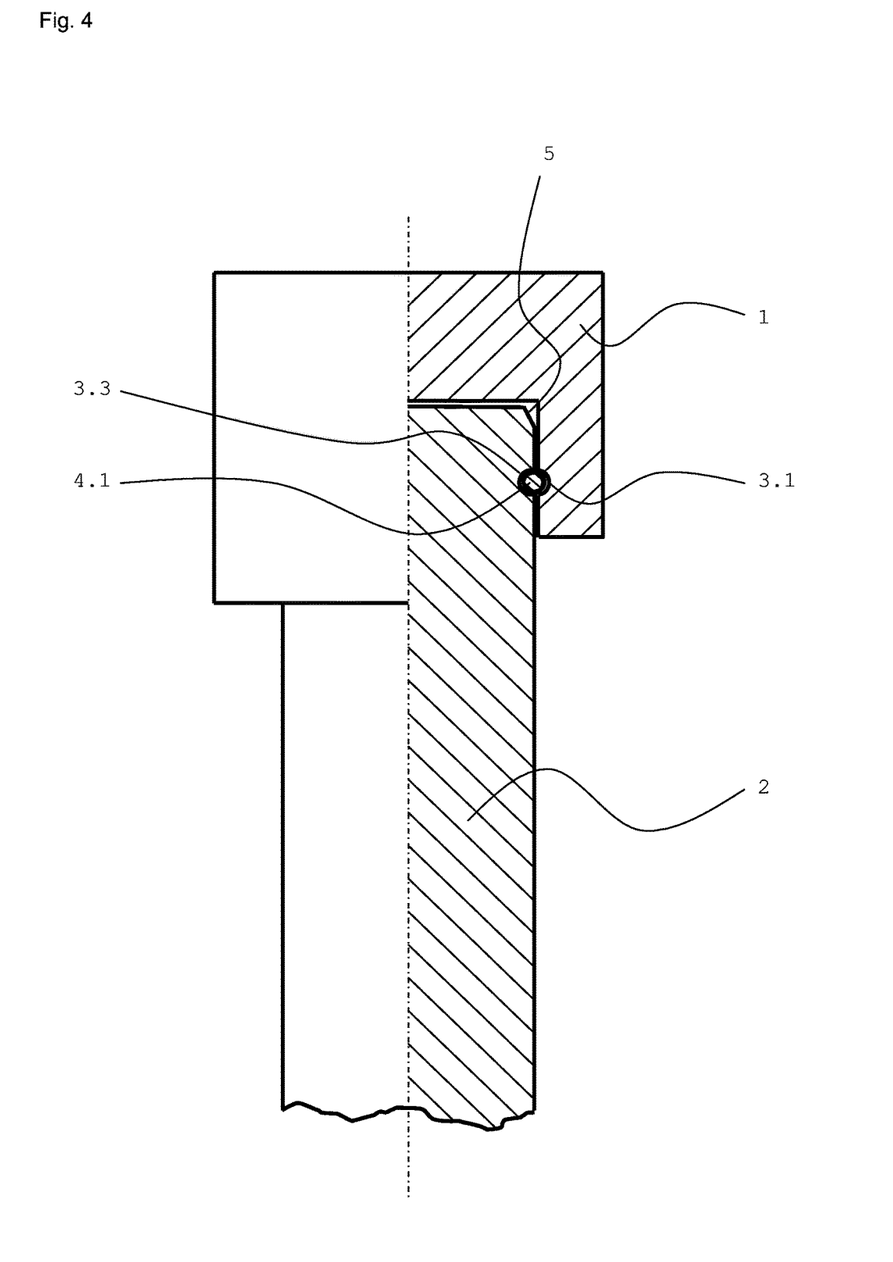

In a further exemplary embodiment as per FIG. 4, the coupling strand 4.1 has a circular cross section.

Such a circular cross section is, in a particularly advantageous manner, associated with a reduction in production costs for the coupling strand 4.1 and with an optimization of the profile of the internal stresses in the coupling strand 4.1 during the bracing thereof.

To realize as large a region as possible in which there is a positive locking action between the coupling strand 4.1 and the annular grooves 3, said annular grooves are adapted in terms of their contour to the cross-sectional geometry of the coupling strand 4.1.

The adaptation of the annular groove contours to the cross section of the coupling strand 4.1 furthermore has the technological advantage that, owing to the resulting roundings of the annular groove contours, notch effects that arise when the positively locking connection is subjected to load can be substantially eliminated.

Figure 5:
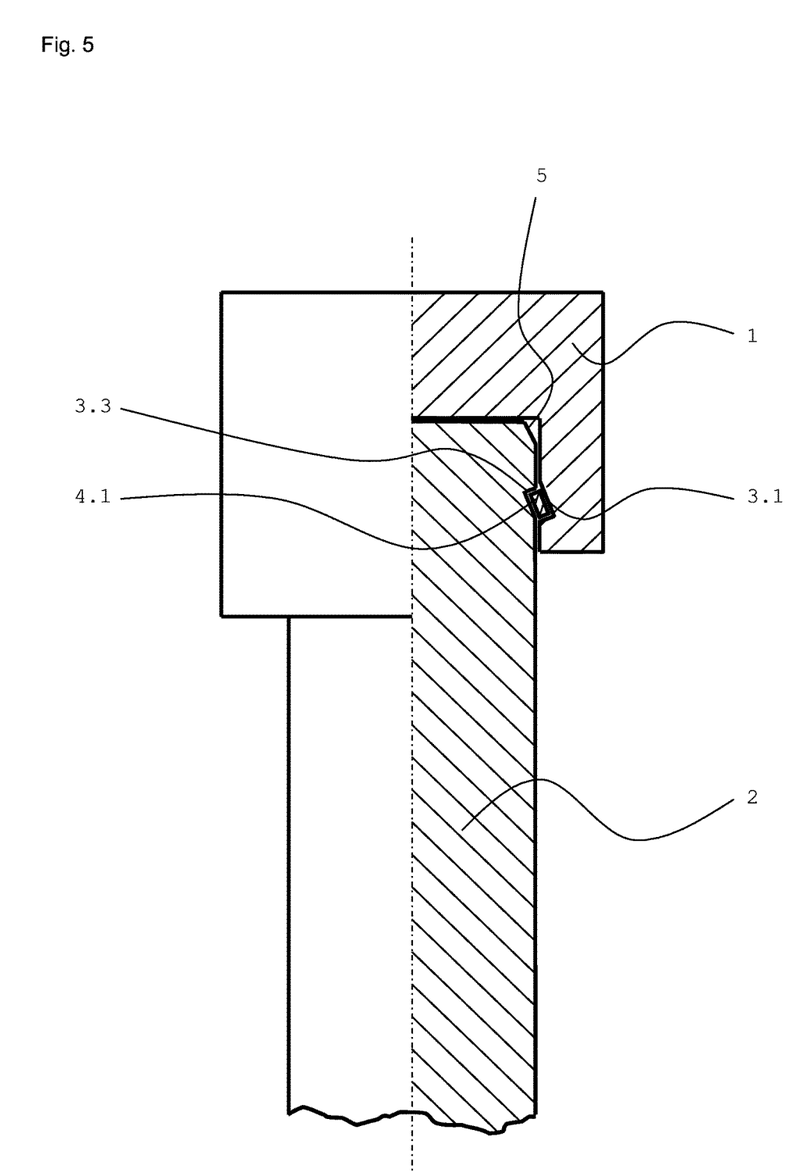

As a further exemplary embodiment, FIG. 5 shows a piston unit according to the invention with a coupling strand 4.1 which is of conical form and which has multiple segments.

In this case, the annular grooves 3.1 and 3.3 are geometrically shaped such that, between them, there is formed a conical annular-groove chamber to which the coupling strand 4.1 adapts, by deformation, as it is inserted.

Figure 6:
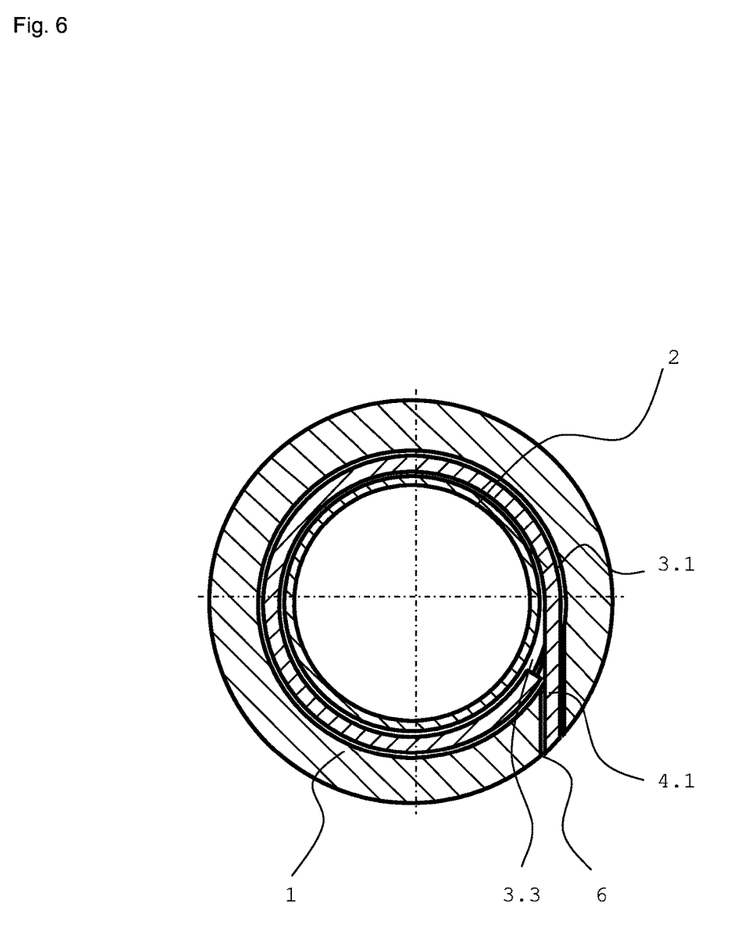

FIG. 6 shows a piston unit according to the invention in a sectional plan view with a piston rod 2 in the form of a hollow element.

As can be seen in FIG. 6, the externally situated piston 1 has a tangential access opening 6 via which the coupling strand 4.1 can be inserted into the annular-groove chamber formed by the annular grooves 3.1 and 3.3.

Figure 7:
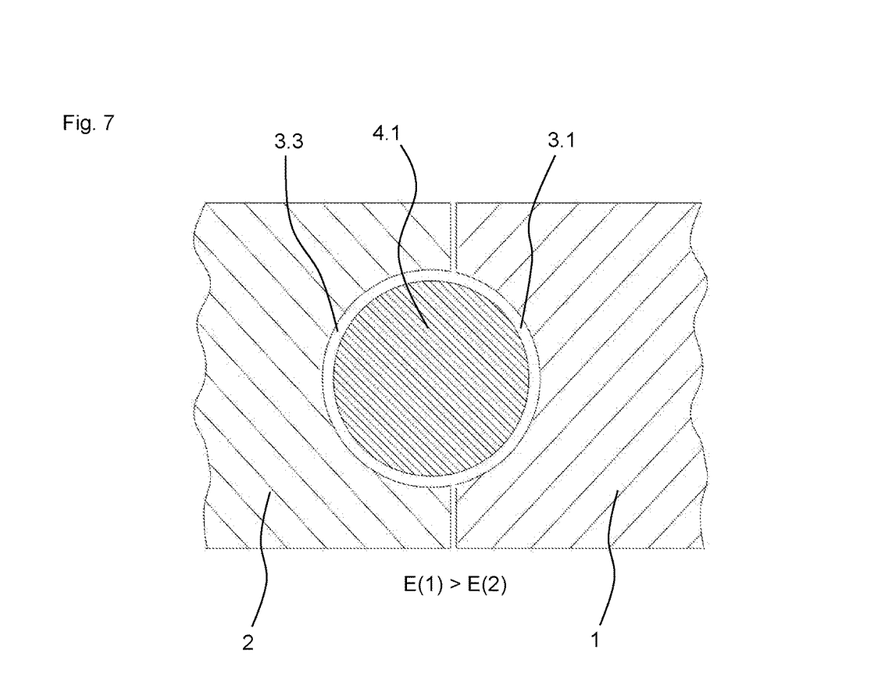
Figure 8:
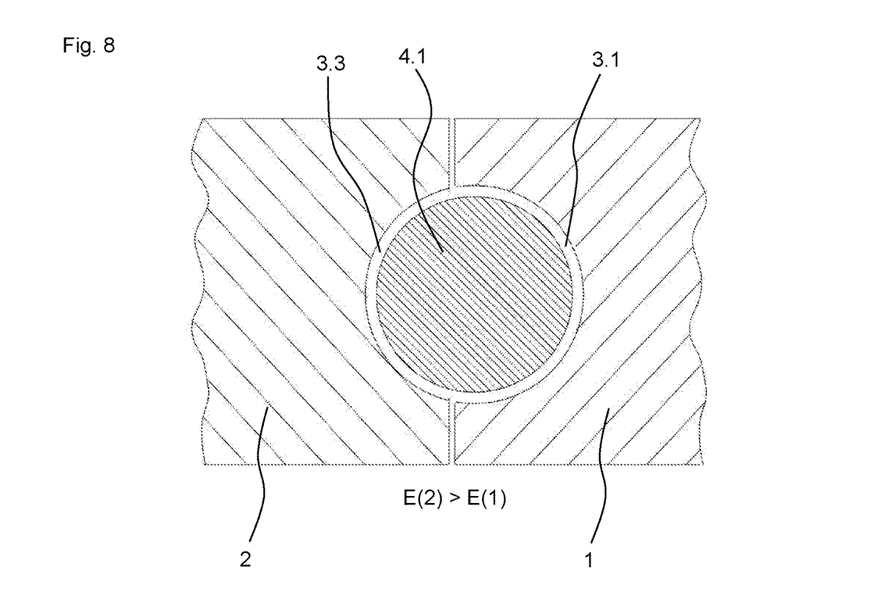

As shown in FIGS. 7 and 8, the first and second coupling partners have different moduli of elasticity $E(1)$ and $E(2)$, a first area of overlap between the engaged coupling strand and a side wall of the annular groove of one of the coupling partners, which has the higher modulus of elasticity, is smaller than a second area of overlap between the coupling strand and a side wall of the annular groove of the other coupling partner, which has a lower modulus of elasticity.

REFERENCE NUMERALS USED

1 Piston
2 Piston rod
3.1 First annular groove, piston
3.2 Second annular groove, piston
3.3 First annular groove, piston rod
3.4 Second annular groove, piston rod
4.1 First coupling strand
4.2 Second coupling strand
5 Run-on bevel
6 Access opening
7 Annular-groove chamber

The invention claimed is:

1. A piston unit of a working cylinder, comprising:
    a first coupling partner being a piston and a second coupling partner being a piston rod, said second coupling partner being coaxially inserted into a bore within said first coupling partner along a longitudinal axis;
    said first and second coupling partners each having a respective annular groove formed therein, said annular groove of said second coupling partner being an external groove on an outer surface of said piston rod and said annular groove of said first coupling partner being an internal groove on an internal surface of said bore in said piston, said annular grooves of said first and second coupling partners being disposed opposite one another and defining an annular-groove chamber, said first coupling partner having an access opening extending from an outer surface of the piston to said annular-groove chamber;
    a coupling strand for engaging into said annular grooves of said first and second coupling partners, said coupling strand being insertable into said annular-groove chamber through said access opening, an engagement of said coupling strand into said annular grooves of said first and second coupling partners effecting a positive locking connection between said first and second coupling partners;
    said second coupling partner having an oversize in relation to an internal diameter of said bore of said first coupling partner, for providing an interference fit effecting a non-positive locking connection between said first and second coupling partner, said interference fit preventing relative movement between said first and second coupling partners for preventing damage to seal elements of the piston unit;
    a hybrid coupling action produced by said interference fit and said coupling strand, said hybrid coupling action including a frictional locking between said first and second coupling partners resulting from said interference fit for axially and rotational locking said first and second coupling partners to one another, said coupling strand for accommodating axial forces acting on said first and second coupling partners.

2. The piston unit according to claim 1, wherein said first and second coupling partners have further, axially offset annular grooves for receiving further, axially offset coupling strands.

3. The piston unit according to claim 1, wherein said coupling strand (4) has a circular cross section.

4. The piston unit according to claim 1, wherein said first and second coupling partners have different moduli of elasticity, a first area of overlap between said engaged coupling strand and a side wall of said annular groove of one of said coupling partners, which has the higher modulus of elasticity, is smaller than a second area of overlap between said coupling strand and a side wall of said annular groove of the other coupling partner, which has a lower modulus of elasticity.

5. The piston unit according to claim 1, wherein said annular-groove chamber has a conical arrangement.

6. The piston unit according to claim 1, wherein an end section of said coupling strand is accessible to pull said coupling strand out of said annular-groove chamber.

7. The piston unit according to claim 1, wherein said first and second coupling partners define contact surfaces of said interference fit that are dimensioned to accommodate axial forces generated in normative load states.

8. The piston unit according to claim 7, wherein said coupling strand is constructed to accommodate critical overloads beyond the normative load states and prevents said first and second coupling partners from being pulled apart by the critical overloads.

* * * * *